United States Patent [19]

Scholten

[11] Patent Number: 5,040,080

[45] Date of Patent: Aug. 13, 1991

[54] ELECTRONIC SCREENING

[76] Inventor: Alvin D. Scholten, 2 Marie Ave., Pelham, N.H. 03076

[21] Appl. No.: 362,205

[22] Filed: Jun. 6, 1989

[51] Int. Cl.$^5$ ............................................. H04N 1/40
[52] U.S. Cl. .................................. 358/454; 358/456; 358/429
[58] Field of Search ............... 358/428, 447, 448, 452, 358/454, 455, 456, 457, 458, 459, 429, 463, 465, 466

[56] References Cited

U.S. PATENT DOCUMENTS

| | | | |
|---|---|---|---|
| 3,911,480 | 10/1975 | Brucker | 358/456 |
| 4,149,183 | 4/1979 | Pellar et al. | 358/459 |
| 4,246,614 | 1/1981 | Knox | 358/456 |
| 4,547,814 | 10/1985 | Hirosawa | 358/456 |
| 4,780,768 | 10/1988 | Tomohisa et al. | 338/456 |

FOREIGN PATENT DOCUMENTS 0163898 12/1985 European Pat. Off. ............ 358/454

*Primary Examiner*—Edward L. Coles, Sr.
*Assistant Examiner*—Jerome Giant, II
*Attorney, Agent, or Firm*—Cesari and McKenna

[57] ABSTRACT

A method of forming a plurality of printing screens, each having a selected frequency and angle, from a single masterdot of mxm elements where each element specifies a weight accorded a printing signal.

2 Claims, 3 Drawing Sheets

| | | | | | | | | | | | | | | |
|---|---|---|---|---|---|---|---|---|---|---|---|---|---|---|
| 254 | 246 | 234 | 218 | 198 | 174 | 146 | 114 | 141 | 169 | 193 | 213 | 229 | 241 | 249 |
| 250 | 238 | 222 | 202 | 178 | 150 | 118 | 86 | 109 | 137 | 165 | 189 | 209 | 225 | 237 |
| 242 | 226 | 206 | 182 | 154 | 122 | 90 | 62 | 81 | 105 | 133 | 161 | 185 | 205 | 221 |
| 230 | 210 | 186 | 158 | 126 | 94 | 66 | 42 | 57 | 77 | 101 | 129 | 157 | 181 | 201 |
| 214 | 190 | 162 | 130 | 98 | 70 | 46 | 26 | 37 | 53 | 73 | 97 | 125 | 153 | 177 |
| 194 | 166 | 134 | 102 | 74 | 50 | 30 | 14 | 21 | 33 | 49 | 69 | 93 | 121 | 149 |
| 170 | 138 | 106 | 78 | 54 | 34 | 18 | 6 | 9 | 17 | 29 | 45 | 65 | 89 | 117 |
| 142 | 110 | 82 | 58 | 38 | 22 | 10 | 2 | 1 | 5 | 13 | 25 | 41 | 61 | 85 |
| 112 | 84 | 60 | 40 | 24 | 12 | 4 | 0 | 3 | 11 | 23 | 39 | 59 | 83 | 111 |
| 144 | 116 | 88 | 64 | 44 | 28 | 16 | 8 | 7 | 19 | 35 | 55 | 79 | 107 | 139 |
| 172 | 148 | 120 | 92 | 68 | 48 | 32 | 20 | 15 | 31 | 51 | 75 | 103 | 135 | 167 |
| 196 | 176 | 152 | 124 | 96 | 72 | 52 | 36 | 27 | 47 | 71 | 99 | 131 | 163 | 191 |
| 216 | 200 | 180 | 156 | 128 | 100 | 76 | 56 | 43 | 67 | 95 | 127 | 159 | 187 | 211 |
| 232 | 220 | 204 | 184 | 160 | 132 | 104 | 80 | 63 | 91 | 123 | 155 | 183 | 207 | 227 |
| 244 | 236 | 224 | 208 | 188 | 164 | 136 | 108 | 87 | 119 | 151 | 179 | 203 | 223 | 239 |
| 252 | 248 | 240 | 228 | 212 | 192 | 168 | 140 | 115 | 147 | 175 | 199 | 219 | 235 | 247 |

ELECTRONIC SCREENING

BACKGROUND OF THE INVENTION

1. Field of the Invention

The invention relates to electronic screening and, more particularly, to electronic color screening.

2. Prior Art

Screening has long been used in the photographic industry to enable halftone reproduction of continuous tone pictures. In this process, transparent screens having a dot or line pattern formed on them are superimposed on the image to be reproduced and the resultant composite is photographed to form a modified image in which the original image is transformed into patterns of dots or lines of varying density representative of the density of tones in the original. The resultant image can readily be reproduced by conventional mechanical printing processes.

With the increasing availability of low cost computers, the screening function is increasingly performed electronically, that is, in a computer. This allows significant control of many of the factors affecting screening, such as dot density, dot size, screen angle, etc., but electronic screening still remains subject to one of the most significant problems encountered with screening, that is, the formation of Moire patterns. Moire patterns are undesired patterns formed by the interaction of similar patterns that are superimposed on each other. The elimination or minimization of such patterns remains a major goal in screening work.

SUMMARY OF THE INVENTION

A. Objects of The Invention

Accordingly, it is an object of the invention to provide an electronic screen generator for the graphic arts.

Further, it is an object of the invention to provide an electronic screen generator that can generate screens at a multiplicity of integer tangent angles.

Still another object of the invention is to provide an electronic screen generator that rapidly generates desired screening patterns.

Yet a further object of the invention is to provide an electronic screen generator that helps to minimize undesired Moire patterns.

B. Brief Summary of The Invention

In accordance with the present invention, an electronic screen generator for color screening is formed by creating, from a master dot pattern S, a plurality of transformed patterns T (hereinafter referred to as "macrodot patterns") that, when tiled (that is, repeated in orthogonal directions throughout a plane) form screen patterns of preselected angular orientations and line frequencies. The masterdot, and thus each macrodot derived from it, comprises a rectangular (preferably square) matrix whose elements comprise threshold values defining reflectance levels with respect to which the reflectance levels of a scanned object are to be compared. As an object is scanned pixel by pixel, a bit is set (or not, as the case may be) in an image that is formed element by element, dependent on the results of the comparison of the reflectance of a particular pixel with the corresponding threshold value in the associated macrodot.

The size of the masterdot, together with the scanning resolution, determines the screen frequency of the masterdot. For example, a square masterdot S of size $m \times m = 16 \times 16$, having 256 elements, when used in conjunction with a scanner having a scan resolution SR of 1016 pixels per inch, provides a basic screen frequency of $SR/m = 1016/16 = 63.5$ lines per inch. This is typical of low-resolution graphic arts printing. The tiling macrodot T for that frequency and for a desired screen angle is then formed from the masterdot as an $n \times n$ matrix, where $n = SR*AF/SF$, SR being the scan (pixel) resolution of the scanner being used to scan an object, SF the desired screen frequency of the resultant macrodot, AF the angle factor which defines the desired screen angle, and * indicates multiplication. Typically, the matrix size n so computed is not an integer, and n is thus rounded off to the nearest integer. For example, for a resolution R of 1016 pixels per inch, a nominal desired line or screen frequency SF of 100 lines per inch, and a desired screen angle of 45°, $n = 14.368$, and is rounded off to 14 to form a $14 \times 14$ macrodot. Rounding off the calculated macrodot size changes the nominal screen frequency corresponding to that macrodot, but not significantly. For example, the actual screen frequency corresponding to a macrodot of size 14 is 102.63 lines per inch, as compared to the desired value of 100 lines per inch.

Unlike much of the prior art, the present invention uses angles defined by small whole number tangents. The preferred angles are 0 degrees for yellow, 18.43 degrees for cyan, 45 degrees for black, and 71.56 degrees for magenta. These angles minimize Moire patterns by generating dot patterns that provide a high repetition frequency. The "angle factor" corresponding to each of these angles is 1, $(10)^{\frac{1}{2}}$, $(2)^{\frac{1}{2}}$, and $(10)^{\frac{1}{2}}$, respectively.

The macrodot values are then determined from the masterdot values by stepping through the masterdot at the desired screen angle and at a step size dependent on the screen angle and recording as successive values in the macrodot the values determined at each step through the masterdot. The values of the macrodot pattern are determined element by element and row by row. On reaching the boundaries of the masterdot while determining the values of the elements within a given row of the macrodot, a point falling outside the masterdot is reflected to its corresponding location within the masterdot. When starting a new row in the macrodot, the row coordinate in the masterdot is incremented by the value of the column increment of the masterdot, while the column coordinate of the masterdot is incremented by the value of the row increment. The scanning of the masterdot continues in this fashion until each element of the macrodot is determined.

A further feature of my invention includes establishing a defined relationship between the patterns of selected macrodots. In particular, I constrain the size of macrodot patterns corresponding to the color black to comprise an integral multiple or submultiple of the macrodot patterns corresponding to cyan or magenta. This reduces or eliminates low frequency beating between the black pattern on the one hand and the cyan and magenta patterns on the other, and greatly improves the reproduced image. Thus, in the example given above of a screen of nominal screen frequency SF=100, the cyan and magenta screens at 18.43 degrees and 71.57 degrees, respectively, are characterized by a macrodot size of 32 (using the nearest whole number for the size). The black screen at the nominal screen frequency SF=100 is calculated as having a macrodot size of 14, as described above. In accordance with the present invention, the size of the macrodot for black is changed to be an integral multiple or submultiple of the cyan and magenta macrodots, and thus is changed to be of size 16 (i.e., 32/2 or "slow black") or size 10.67 (32/3 or "fast black"). These correspond to screen frequencies of 63.5 and 95.3 lines per inch, respectively, for the system described here.

Still further in accordance with the invention, in forming the macrodot pattern, I establish a histogram (referred to herein as a "running histogram") of the values determined for each element as those values are being determined. Prior to recording or storing a given value for a particular element in the macrodot, I examine the number of elements in the macrodot which have previously been assigned values within a selected range of values around the value in question. If a particular value has appeared with less frequency than the value under consideration, I substitute the particular value for the value in question. This has the effect of smoothing the image and can significantly enhance its appearance.

Once the macrodot pattern is determined, it can be "tiled", that is, replicated, to extend as wide and as high as desired. The tiling can be performed by actually repeating the pattern in memory or simply by repeatedly operating on the same pattern. No further reference to the masterdot pattern need then be made, nor need any further calculations (other than comparison of reflectance values) be done. Thus, the major computation is done at the outset, in establishing the macrodot, and screening of any object is thereafter performed rapidly and efficiently.

DETAILED DESCRIPTION OF THE INVENTION

The foregoing and other and further objects of the invention will be more readily understood on reference to the following detailed description of the invention when taken in conjunction with the accompanying drawings in which:

FIG. 1 is a 16 by 16 of a typical masterdot in accordance with the invention showing the reflectance values of each element;

FIG. 2A is a generalized masterdot matrix corresponding to that of FIG. 1 and showing the manner in which the macrodot values are derived from the masterdot for a particular screen frequency and angle;

FIG. 2B is a macrodot formed from the masterdot of FIG. 2A as described herein;

In FIG. 1, a representative masterdot in accordance with the invention comprises an array of elements defining reflectance values for an object to be scanned. Each element corresponds to a single scan pixel and collectively the elements comprise a single masterdot. As an object is scanned pixel by pixel, the reflectance from the object at successive pixels is compared with successive elements of the masterdot. When the reflectance of the object at the position of a given pixel exceeds the value of the corresponding element of the masterdot, a bit in the calculated image is set to 0 or 1 to thereby form a record of the image.

The masterdot is stored in memory for ready access during scanning or at least during subsequent processing. In the masterdot shown in FIG. 1, a square array of 16 by 16=256 elements provide up to 256 different dots of varying shape and size, and thus 256 gray levels. The values of the particular dot shown in FIG. 1 are arranged to provide a "diamond" pattern, although other patterns may be used in the invention.

The masterdot shown in FIG. 1 may be considered to lie at an angle of zero degrees; this would correspond, for example, to a "yellow screen", that is, a screen for the color yellow. In order to form screens for the other typical color separation screens, it is necessary to rotate the masterdot to the desired screen angles. This rotation not only changes the angle of the screen, it also changes the size of the dot and the values at given locations as will now be described in detail.

Figure 3:
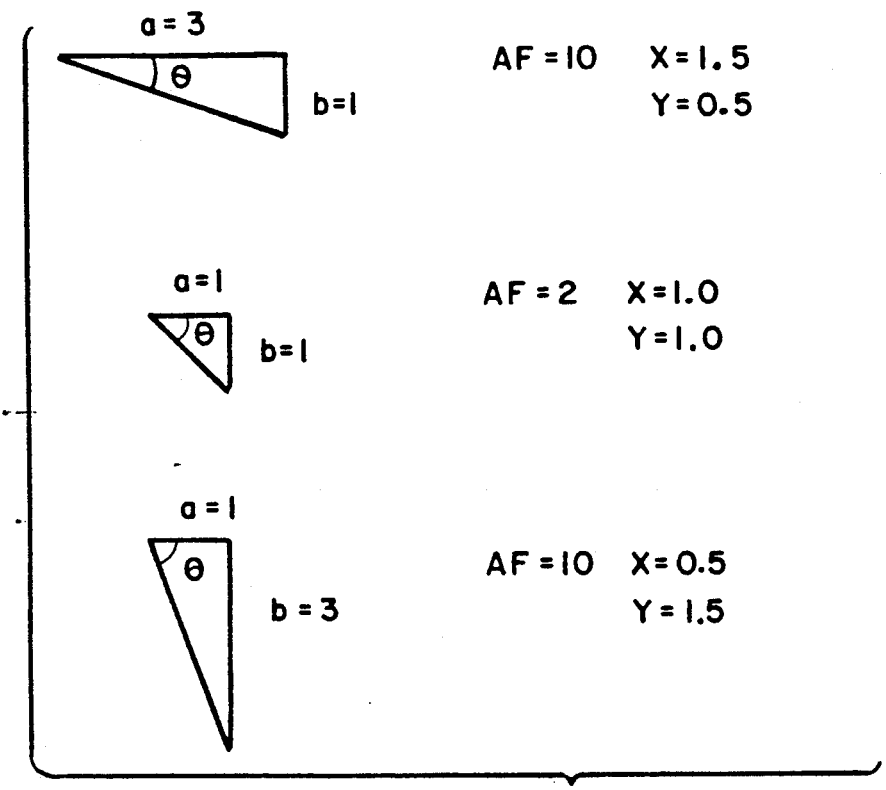
FIG. 3 is a schematic representation of various parameters in accordance with the invention associated with integer tangent angles of 18.43, 45, and 17.57 degrees, respectively.
Figure 4:
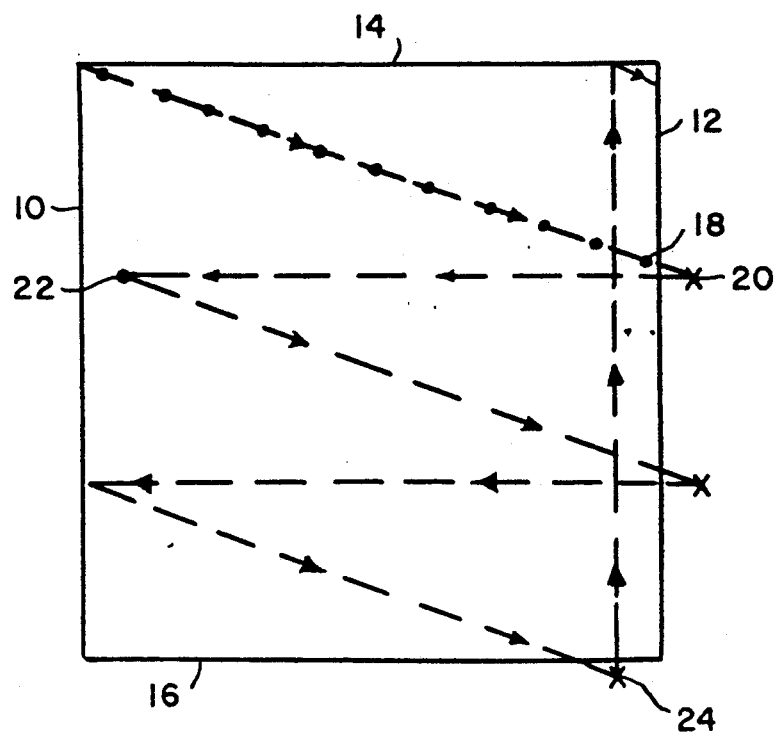
FIG. 4 is an illustrative example of the manner in which the macrodot values are formed in accordance with the invention.

In FIG. 2, a generalized masterdot (FIG. 2A) and macrodot (FIG. 2B) are shown for a scanning resolution $SR=1016$, a nominal screen frequency $SF=100$, and a screen angle of 18.43 degrees corresponding to an "integral tangent" angle of $\tan^{-1}\frac{1}{3}$ (see FIG. 3). A screen at this angle is typically used for the color cyan, for example. The angle factor is given by $(a_2^2+b_2^2)^{\frac{1}{2}}=(10)^{\frac{1}{2}}$. To form the desired macrodot with these parameters from the given masterdot, the appropriate step size is first determined. Referring to FIG. 4, the masterdot may be considered to be oriented along an x-y coordinate system, the x direction lieing along the direction of the rows of the masterdot, and the y direction lieing along the direction of the columns. To form the macrodot from the masterdot, the masterdot matrix is stepped through by increments of $kx=(MS*a)/MDS$ in the x direction and by $ky=(MS*b)/MDS$ in the y direction, where MS is the masterdot size (in the example here, $MS=16$), MDS is the macrodot size (here, $MDS=32$), and a is the base of the "integer tangent" triangle (see FIG. 3). For the values given, $kx=(16*3)/32=1.5$ and $ky=(16*1)/32=0.5$. At each step, the value of one of the elements of the macrodot matrix is calculated from the corresponding values of the masterdot matrix.

In particular, a starting point in the masterdot matrix is selected. Although this may be the point $x_0$, for uniformity of calculation the first point is selected to lie at $kx/2=0.75$ and $ky/2=0.25$ from $x_0$. This point corresponds to $y_0$ in the macrodot. Preferably, the value of this point is calculated by interpolation, although other techniques such as choosing the "nearest neighbor" may be used. In interpolating, interpolation is first performed on the value of a first pair of elements, e.g., $x_0$ and $x_{16}$. Since these are oriented in the y direction, and the starting point lies at $y=0.25$, the desired value lies at 0.25 the distance between $x_0$ and $x_{16}$, that is, 0.25 the distance between 249 and 237 (see FIG. 1). This value is then determined to be 246. Next, interpolation is performed on the adjacent vertical pair, $x_1$, $x_{17}$. Again, this value is determined to be 237. Finally, interpolation is performed between these values, using the fact that the x value of the point to be determined is $x=0.75$, that is, the desired point lies at 0.75 of the distance between between these points in the x direction. The interpolated value is then calculated as $237+0.75*(251-246)=239.25$ or approximately 239. This is the value of the point $y_0$ in the macrodot.

Each successive point $y_1$ in the macrodot is then calculated by successively incrementing x by kx and y by ky in the masterdot and interpolating between the four adjacent values at the resultant location in the masterdot. When a boundary of the masterdot is reached, the trace is reset to its corresponding position within the masterdot and the process continued. For example, in FIG. 4, the masterdot of size 16 by 16 has left and right boundaries 10, 12 and top and bottom boundaries 14, 16, respectively. When the trace passes through point 18, the next increment in kx and ky carries it to point 20, designated by "x and having coordinates $x=17.25$, $y=5.75$. Since this lies outside the masterdot boundary, the trace is resumed at the corresponding point within it, namely, at point 22, having coordinates $x=1.25$, $y=5.75$, and the trace then continues. A similar procedure is followed when the trace runs through point 24 at the bottom of the masterdot. The arrows on the trace show the direction of successive points on the trace.

After the first line of the macrodot is formed, the trace is returned to a new starting position. This position is located a distance ky in the x direction from the initial starting position, and a distance kx in the y direction from the initial starting position. Note the interchange of the increments (ky for the x direction, kx for the y direction). This ensures that the pattern for the next line will not be merely a repeat of the pattern for the previous line.

In accordance with the present invention, as each value of the macrodot is calculated, it is preferably smoothed. This is accomplished by forming a "running histogram" of values used in the masterdot. As each value is calculated as described above, the frequency of occurrence of that value in the macrodot is compared with the frequency of occurrence of values within a selected range of the given value. If the frequency of the given value exceeds the frequency of any value within the range, the given value is replaced by one of the other values within the range.

For example, if a particular element is calculated as having the value 236, the number of elements having values between 232 and 240 is examined. If there are no more elements having the value 236 than there are elements having one of the other values within the range, then the value 236 is recorded for the element in question, and the record of the number of elements having the value 236 is incremented by one. If, however, there is at least one value in the range which has been used less frequently than the the given value, the less-used value is substituted for the given value.

CONCLUSION

From the foregoing it will be seen that although the invention has been described with reference to particular word sizes and register configurations, it will be understood by those skilled in the art that it is not so limited, and that various changes may be made in the foregoing without departing from either the spirit or the scope of the invention.

Having illustrated and described my invention, I claim:

1. A method of forming a plurality of printing screens, each having a selected frequency and angle, from a single masterdot of size m elements by m elements, the elements of said masterdot specifying a weight to be accorded a printing signal in the position corresponding to the element, comprising the steps of:
   A. selecting a macrodot size for a first of said screens as the ratio of the screening resolution and the line frequency to be used,
   B. selecting a macrodot size for a second of said screens as the product of the selected macrodot size for said first screen and an angle factor selected from the group comprising small whole numbers and small integer fractions,
   C. changing, as necessary, the macrodot size for one of said screens to the nearest integer having the property such that the ratio of the macrodot size of at least one of said screens to the macrodot size of another of said screens is a small whole number, and
   D. for each screen:
      (1) forming the macrodot by stepping through the masterdot an incremental distance in a first direction equal to the ratio m/n and an incremental distance in the second direction equal to (m/n) tan A, where m is the masterdot size, n is the macrodot size, and A is the selected screen angle, and
      (2) tiling said macrodots to form a screen of desired area.

2. The method of claim 1 in which screens are formed at angles corresponding to the tangents of 0, ½, 1, and 3.

* * * * *